(12) United States Patent
Woltring et al.

(10) Patent No.: US 8,412,473 B2
(45) Date of Patent: Apr. 2, 2013

(54) EVENT MONITORING AND DETECTION IN LIQUID LEVEL MONITORING SYSTEM

(75) Inventors: Kelvin L. Woltring, Gresham, OR (US); Wayne A. Case, Portland, OR (US); Christian N. Staats, Portland, OR (US); Kenneth M. Wegrzyn, Hillsboro, OR (US)

(73) Assignee: Schmitt Industries, Inc., Portland, OR (US)

( * ) Notice: Subject to any disclaimer, the term of this patent is extended or adjusted under 35 U.S.C. 154(b) by 221 days.

(21) Appl. No.: 13/084,121

(22) Filed: Apr. 11, 2011

(65) Prior Publication Data

US 2012/0259560 A1   Oct. 11, 2012

(51) Int. Cl.
*G01F 23/28* (2006.01)
*G01F 15/06* (2006.01)
*G06F 19/00* (2011.01)
*G06F 17/40* (2006.01)

(52) U.S. Cl. ........... 702/55; 73/149; 73/290 R; 340/618; 340/621; 702/159; 702/166; 702/187; 702/189

(58) Field of Classification Search .............. 73/149, 73/290 R, 290 B, 290 V, 432.1, 570, 584, 73/596, 627, 629, 362, 861, 861.01, 861.18, 73/861.25, 861.27, 861.28, 861.29, 865.8; 181/123, 124; 340/500, 540, 603, 612, 618, 340/621, 870.01, 870.07, 870.16, 870.17, 340/870.28; 367/87, 99, 118, 127, 908; 702/1, 702/33, 50, 54, 55, 127, 155, 158, 159, 166, 702/170, 171, 187, 189; 708/100, 105, 200; G01B 21/00, 21/18; G01F 15/00, 15/06, G01F 15/061, 23/00, 23/22, 23/28, 23/296, G01F 23/2962; G06F 11/00, 11/30, 11/32, G06F 17/00, 17/40, 17/90
See application file for complete search history.

(56) References Cited

U.S. PATENT DOCUMENTS 2,570,218 A * 10/1951 Draganjac ................. 73/304 C
2,600,341 A *  6/1952 Thompson ..................... 73/313
(Continued)

FOREIGN PATENT DOCUMENTS

EP    0151753 A2 *  8/1985
JP    08-211883         8/1996
(Continued)

OTHER PUBLICATIONS

Response to Office Action dated Nov. 17, 2006 for U.S. Appl. No. 11/131,435.*

(Continued)

*Primary Examiner* — Edward Cosimano
(74) *Attorney, Agent, or Firm* — John R. Thompson; Stoel Rives LLP

(57) ABSTRACT

According to various embodiments disclosed herein, battery power may be conserved by reducing the number of transmissions made by a liquid level monitoring system. The efficiency of a liquid level monitoring system may also be improved by reducing or avoiding fuel outages and unnecessary replenishment. Certain embodiments may be configured according to a schedule for making measurements. The measurement may then be compared against one or more thresholds to determine whether to transmit the measurements. A variety of thresholds may be specified and utilized to determine when it is appropriate to transmit the measurements. Further, various embodiments may be configured to detect a change in a monitored condition. Upon the detection of a change in the monitored condition, a measurement may be made and compared to an established threshold for a tank.

24 Claims, 7 Drawing Sheets

U.S. PATENT DOCUMENTS

| | | | |
|---|---|---|---|
| 2,775,748 A * | 12/1956 | Rod et al. | 73/290 V |
| 3,100,885 A * | 8/1963 | Welkowitz et al. | 367/95 |
| 3,687,219 A | 8/1972 | Langlois | |
| 3,985,030 A | 10/1976 | Charlton | |
| 4,320,659 A | 3/1982 | Lynworth et al. | |
| 4,440,025 A | 4/1984 | Hayakawa et al. | |
| 4,602,344 A * | 7/1986 | Ferretti et al. | 702/55 |
| 4,736,329 A * | 4/1988 | Ferretti et al. | 700/281 |
| 4,788,648 A * | 11/1988 | Ferretti et al. | 702/55 |
| 4,815,323 A | 3/1989 | Ellinger et al. | |
| 4,853,694 A | 8/1989 | Tomecek | |
| 4,868,797 A | 9/1989 | Soltz | |
| 4,901,245 A | 2/1990 | Olson et al. | |
| 5,131,271 A | 7/1992 | Haynes et al. | |
| 5,150,334 A | 9/1992 | Crosby | |
| 5,195,058 A | 3/1993 | Simon | |
| 5,235,553 A | 8/1993 | Garlick et al. | |
| 5,261,274 A | 11/1993 | Nemirow | |
| 5,303,585 A * | 4/1994 | Lichte | 73/290 V |
| 5,319,973 A | 6/1994 | Crayton et al. | |
| 5,335,545 A | 8/1994 | Leszczynski | |
| 5,425,523 A | 6/1995 | Madey et al. | |
| 5,511,041 A | 4/1996 | Michalski | |
| 5,563,478 A | 10/1996 | Suganuma | |
| 5,568,449 A | 10/1996 | Rountree et al. | |
| 5,586,085 A | 12/1996 | Lichte | |
| 5,644,299 A | 7/1997 | Cruickshank | |
| 5,697,248 A | 12/1997 | Brown | |
| 5,755,136 A | 5/1998 | Getman et al. | |
| 5,778,726 A | 7/1998 | Muller et al. | |
| 5,866,815 A | 2/1999 | Schwald et al. | |
| 5,991,234 A | 11/1999 | Sejalon et al. | |
| 6,053,041 A | 4/2000 | Sinha | |
| 6,317,029 B1 | 11/2001 | Fleeter | |
| 6,396,819 B1 | 5/2002 | Fleeter et al. | |
| 6,397,656 B1 | 6/2002 | Yamaguchi et al. | |
| 6,412,344 B1 | 7/2002 | Danicich et al. | |
| 6,481,627 B1 | 11/2002 | Guerreri | |
| 6,536,275 B1 | 3/2003 | Durkee et al. | |
| 7,245,059 B2 | 7/2007 | Lagergren et al. | |
| 7,287,425 B2 | 10/2007 | Lagergren | |
| 7,905,143 B2 * | 3/2011 | Lagergren | 73/290 V |
| 8,104,341 B2 * | 1/2012 | Lagergren et al. | 73/290 V |
| 2004/0016442 A1 | 1/2004 | Cawlfield | |
| 2004/0173021 A1 | 9/2004 | Lizon et al. | |
| 2005/0192727 A1 | 9/2005 | Shostak et al. | |
| 2005/0284218 A1 | 12/2005 | Lagergren | |
| 2005/0289021 A1 | 12/2005 | Lagergren | |
| 2006/0144139 A1 | 7/2006 | Miyagawa | |
| 2006/0169056 A1 | 8/2006 | Dockendorff et al. | |
| 2006/0236766 A1 | 10/2006 | Quirch et al. | |
| 2007/0016069 A1 | 1/2007 | Grunwald et al. | |
| 2007/0080609 A1 | 4/2007 | Johnson et al. | |
| 2007/0084283 A1 | 4/2007 | Carlson et al. | |
| 2007/0261487 A1 | 11/2007 | Sintes et al. | |
| 2008/0208060 A1 | 8/2008 | Murkin | |
| 2008/0319688 A1 | 12/2008 | Kim | |
| 2009/0025474 A1 | 1/2009 | Lagergren | |
| 2009/0303059 A1 * | 12/2009 | Von Lintzgy et al. | 340/621 |
| 2010/0242593 A1 | 9/2010 | Lagergren et al. | |

FOREIGN PATENT DOCUMENTS

| | | |
|---|---|---|
| WO | WO2009/014790 | 1/2009 |
| WO | WO 2010/111450 A2 * | 9/2010 |

OTHER PUBLICATIONS

Response to Restriction Requirement dated May 28, 2009 for U.S. Appl. No. 11/880,671.*
International Search Report dated Mar. 25, 2010 for PCT/US2010/028586.
Notice of Allowance dated Jan. 20, 2011 for U.S. Appl. No. 11/880,671.
Office Action dated Jul. 28, 2010 for U.S. Appl. No. 11/880,671.
Office Action dated Apr. 14, 2010 U.S. Appl. No. 11/880,671.
Office Action dated Oct. 2, 2009 for U.S. Appl. No. 11/880,671.
Office Action dated Nov. 17, 2006 for U.S. Appl. No. 11/131,434.
Office Action dated Nov. 21, 2006 for U.S. Appl. No. 11/131,435.
International Search Report and Written Opinion dated Aug. 7, 2008 for PCT/US08/62603.
Restriction Requirement dated May 28, 2009 for U.S. Appl. No. 11/880,671.
Notice of Allowance dated May 3, 2007 for U.S. Appl. No. 11/131,434.
Notice of Allowance dated May 22, 2007 for U.S. Appl. No. 11/131,435.
International Search Report and Written Opinion for PCT/US2012/027199 filed Mar. 1, 2012, and mailed Sep. 3, 2012, 8 pgs.
International Preliminary Report on Patentability and Written Opinion mailed Oct. 28, 2010 for PCT/US2010/028586.
Office Action mailed Sep. 7, 2011 for U.S. Appl. No. 12/411,242.

* cited by examiner

EVENT MONITORING AND DETECTION IN LIQUID LEVEL MONITORING SYSTEM

TECHNICAL FIELD

The present disclosure relates to systems and methods for event monitoring and detection in liquid level monitoring systems. Various embodiments disclosed herein improve the battery life of liquid level monitoring systems and will improve the reliability and efficiency of systems using consumable liquids (e.g., liquid propane) that are manually replenished.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting, the embodiments will be described and explained with specificity and detail in reference to the accompanying drawings, in which:

DETAILED DESCRIPTION OF PREFERRED EMBODIMENTS

Figure 1A:
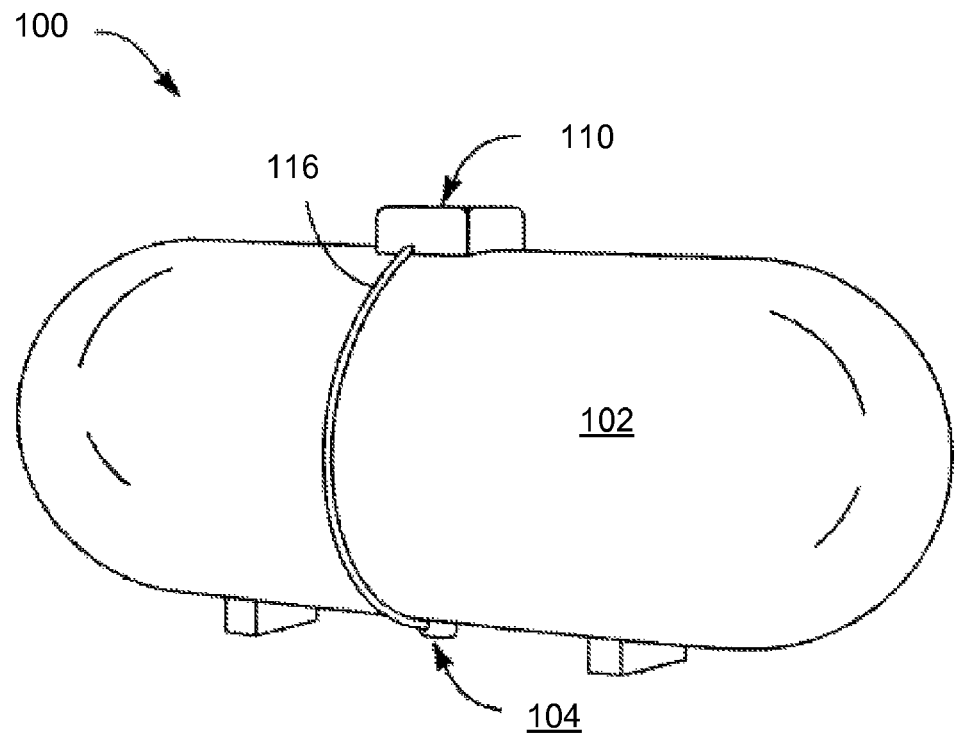
FIG. 1A is a perspective view of an embodiment of an ultrasonic liquid level monitoring system mounted externally to a propane fuel tank.

It will be readily understood that the components of the embodiments, as generally described and illustrated in the Figures herein, could be arranged and designed in a wide variety of different configurations. Thus, the following more detailed description of various embodiments, as represented in the Figures, is not intended to limit the scope of the present disclosure, as claimed, but is merely representative of various embodiments. While the various aspects of the embodiments are presented in the drawings, the drawings are not necessarily drawn to scale unless specifically indicated.

The phrases "connected to," "coupled to" and "in communication with" refer to any form of interaction between two or more entities, including mechanical, electrical, magnetic, and electromagnetic interaction. Two components may be coupled to each other, even though they are not in direct contact with each other.

Systems for monitoring a liquid level may be used in a variety of circumstances and applications involving systems that utilize a consumable liquid. Such systems may require periodic manual replenishment. For example, a liquid propane tank may be used as a fuel source for a wide variety of systems. The level of liquid propane tank may be monitored so that manual replenishment occurs as needed.

Inefficiencies may result by simply replenishing tanks on a fixed schedule, particularly in instances where demand for the consumable liquid is variable. For instance, if demand for the consumable liquid is low during a specific period, it may be unnecessary to replenish the consumable liquid, according to the fixed schedule. By contrast, if demand for the consumable liquid is high during a specific period, the supply of the consumable liquids stored in the tank may be exhausted before the next scheduled replenishment. Therefore, suppliers may be faced with "No Fill Needed" or "Out of Fuel" events, which are inefficient and costly.

A liquid level monitoring system may be utilized in order to determine a liquid level in the storage tank. Various embodiments of such systems are disclosed in U.S. Pat. No. 7,287,425 (the "425 Patent"), in U.S. Pat. No. 7,905,143 (the "143 Patent"), and U.S. patent application Ser. No. 12/411,242 (the "242 Application") now U.S. Pat. No. 8,104,341. The entirety of the 425 Patent, the 143 Patent, and the 242 Application are incorporated by reference.

Various embodiments of liquid level monitoring systems disclosed in the 425 Patent, the 143 Patent, and the 242 Application rely on battery power. Reducing power consumption in such systems may allow the systems to operate more reliably, for longer periods of time, and less expensively. While the cost of the batteries may be relatively low, according to various embodiments, an operator may need to be dispatched to a remote location in order to simply replace batteries. Various embodiments disclosed herein, and in connection with the 425 Patent, the 143 Patent, and the 242 Application, utilize satellite communication for the transmission of various measurements. In addition to consuming power, satellite transmissions may also have an associated cost. Accordingly, reducing the number of transmissions may both decrease power consumption and decrease expenses associated with data transmission. Further, by moving to an event driven schedule for transmission, fuel outages and unnecessary refueling trips may be more effectively avoided.

According to various embodiments disclosed herein, battery power may be conserved by reducing the number of transmissions made by a liquid level monitoring system. Certain embodiments may be configured, according to a schedule for making measurements. The measurement may then be compared against one or more thresholds to determine whether to transmit the measurements. A variety of thresholds may be specified and utilized to determine when it is appropriate to transmit the measurements. For example, a threshold may relate to a liquid level in a tank or to a temperature at a location of the liquid level monitoring system. Further, various embodiments may be configured to detect a change in a monitored condition (e.g., use of a liquid stored in a tank, a temperature at a location of the liquid level monitoring system, etc.). Upon the detection of a change in the monitored condition, a measurement may be made and compared to a threshold. Such embodiments may further conserve battery power by reducing the number of measurements to be made and by reducing the number of measurements transmitted.

Sensing of a liquid level in a tank may be performed utilizing sonic or ultrasonic measurement techniques. An externally mounted ultrasonic emitter may generate an ultrasonic beam and receive an echo of the ultrasonic beam off a liquid surface inside the tank. The amount of time that passes between generating the beam and receiving the echo may be determined and may be referred to as a time-of-flight. If a liquid level and density are known and the geometry of a tank is known, then the liquid volume in the tank can be calculated, based upon the measured time-of-flight.

Figure 1B:
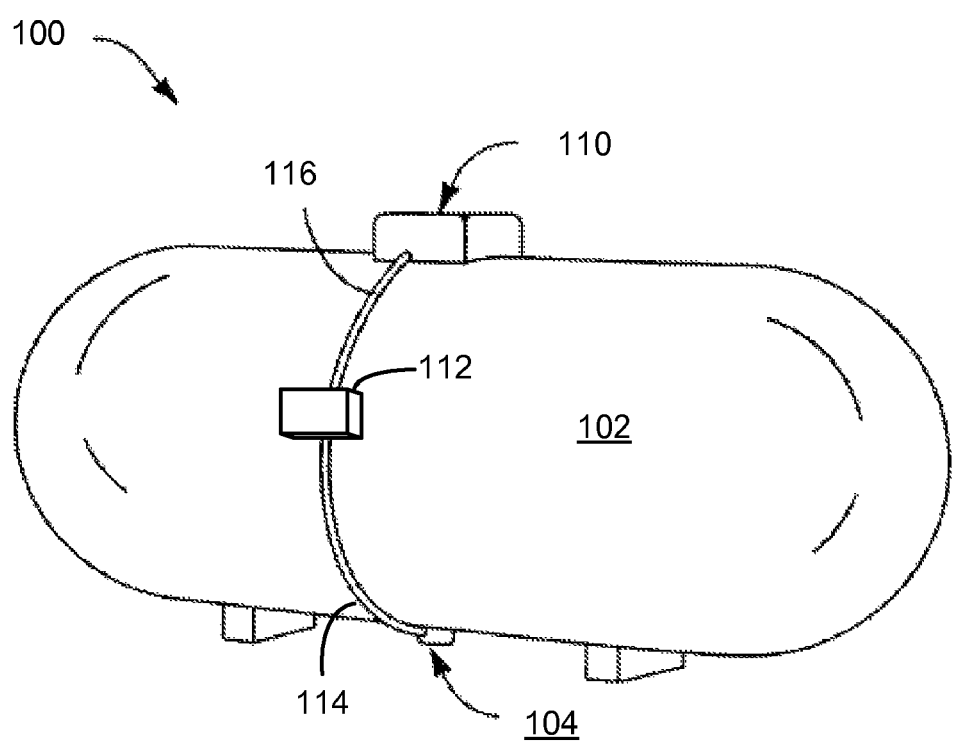
FIG. 1B is a perspective view of an embodiment of an ultrasonic liquid level monitoring system, including a battery box mounted externally to a propane fuel tank.

Referring to FIGS. 1A and 1B, an ultrasonic liquid level monitoring system 100 is shown for sensing a liquid level inside a tank 102. The system 100 includes an ultrasonic transducer unit 104 that is externally mounted to the bottom of the tank 102. In an alternative embodiment, an ultrasonic transducer unit may be mounted to the top of the tank. If the transducer unit is mounted to the top of the tank, the ultrasonic beam may be passed through a tank wall and then through the gas phase above the liquid. An echo may be caused at the gas/liquid interface. The relatively higher losses of acoustic energy while transiting the gas phase can be mitigated by using an acoustic lens to shape the ultrasonic beam into a more compact beam and by using an acoustic coupler to increase the transmission of the ultrasonic beam through the tank wall. The liquid in the tank may be a liquid fuel, such as propane.

According to the embodiment illustrated in FIG. 1A, an electrical cable 116 connects the ultrasonic transducer unit 104 to a communications unit 110. Electrical cable 116 may be configured to provide a data link between the ultrasonic transducer unit 104 and the communications unit 110. In addition, the communications unit 110 may include a battery (not shown), and electrical cable 116 may provide electrical power to the ultrasonic transducer unit 104. The ultrasonic transducer unit 104 transmits ultrasonic signals through the tank wall and receives return echoes from the liquid surface (not shown) in the tank. These signals are transmitted back to the communications unit 110. The communications unit 110 directs the operation of the transducer unit 104 and collects time-of-flight data and temperature data from the transducer unit 104. The embodiment illustrated in FIG. 1A may be utilized in connection with a variety of tank sizes, including small standard tank sizes.

According to the system illustrated in FIG. 1B, the system 100 includes a battery box 112 that is in electrical communication with the transducer unit 104 through an electrical cable 114. The electrical cable 114 may be configured to provide a data link as well as electrical power to the transducer unit 104.

The battery box 112 may be located in a position that allows for easy access within communications unit 110. Operators of the system 100 may be required to access the battery box within communications unit 110 in order to replace a battery. As shown in FIG. 1B, battery box 112 may be disposed between the transducer unit 104 and a communications unit 110 or the battery may be included in communications unit 110. Communications unit 110 may be mounted to the top of tank 102 or in another suitable location. Communications unit 110 may be connected to battery box 112 through an electrical cable 116 or it may contain the battery within as well as data communications equipment (e.g., a serial data port, a Bluetooth transceiver, an IEEE 802.11 transceiver, etc.). The communications unit 110 may be configured to interface with any number of communications systems, such as a satellite system, a cellular communication system, a telephone system, a data network, etc. The length of electrical cables 114 and 116 may be adjusted to position the battery box 112 at a convenient location that permits easy access by system operators.

Figure 2:
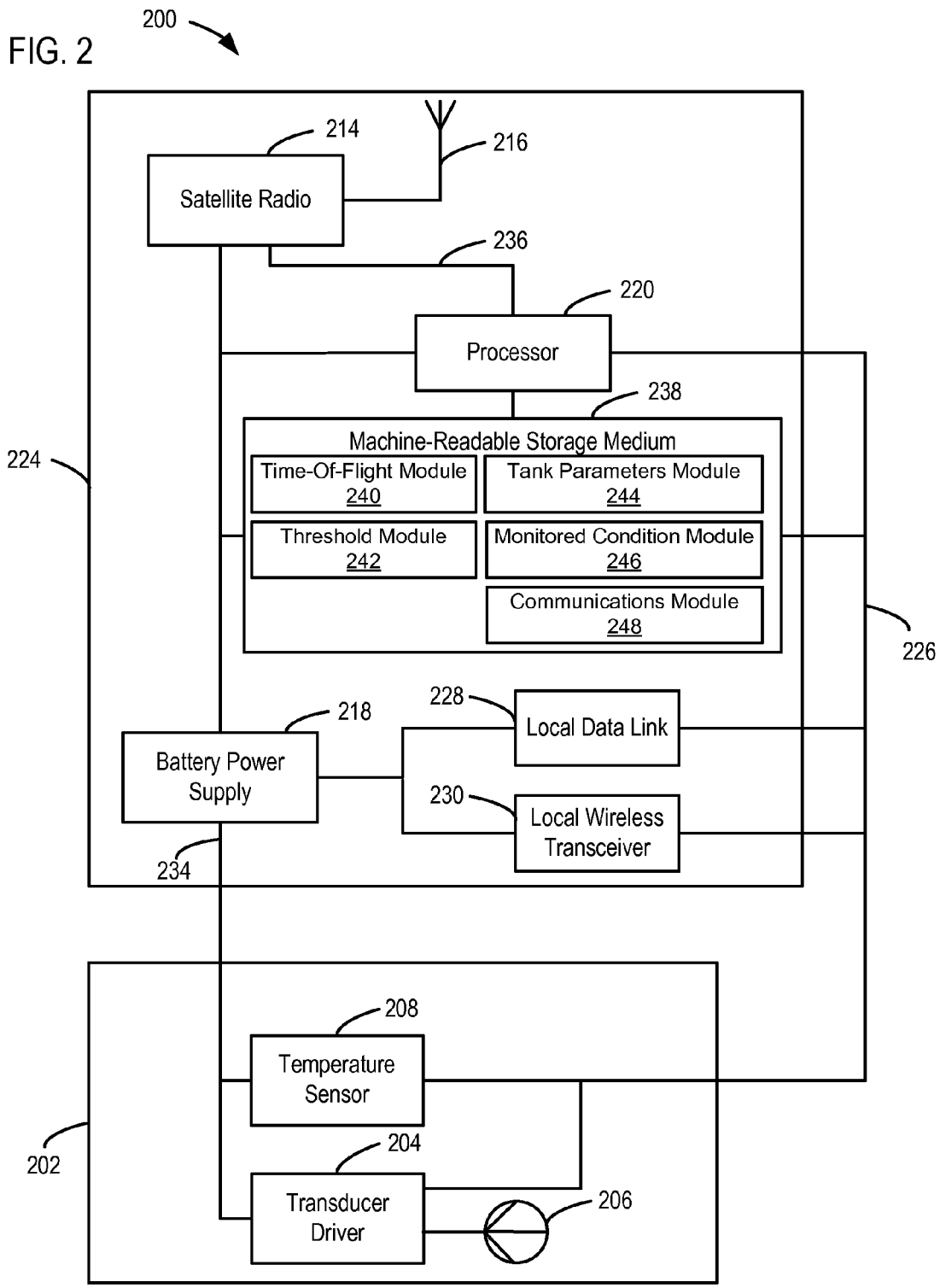
FIG. 2 is a block diagram of an embodiment of a monitoring system.

FIG. 2 illustrates a block diagram of an ultrasonic liquid level monitoring system 200. The system 200 includes a transducer unit 202 comprising a transducer driver 204, an emitter 206 to emit an ultrasonic beam and receive an echo, and a temperature sensor 208. The emitter 206 may be embodied as a piezoelectric crystal transducer 206. When excited, the piezo 206 emits an ultrasonic beam. The temperature sensor 208 may be used to obtain a measurement of the temperature of the liquid in the tank, which is desirable in order to adjust readings taken for variations in the volume of the liquid caused by temperature variations.

System 200 also includes a communication unit 224 that is in electrical communication with the transducer unit 202. According to the illustrated embodiment, a battery 218 is contained within communications unit 224. The battery 218 is in electrical communication with all components in the ultrasonic liquid level monitoring system 200 requiring electrical power. An electrical cable 234 may connect the transducer unit 202 to the communications unit 224.

The communications unit 224 may also contain a local data link 228 and a wireless transceiver 230. The local data link 228 and the wireless transceiver 230 may be in communication with a processor 220 and/or a machine-readable storage medium by way of a data connection 226. According to one embodiment, local data link 228 may be embodied as an RS-232 port. In alternate embodiments, local data link 228 may be embodied as an Ethernet port, universal serial bus (USB) port, IEEE 1394 port, and the like. Local data link 228 may be connected to a wireless transceiver 230. Wireless transceiver 230 may be a Bluetooth wireless module, or may operate using other wireless technologies including IEEE 802.11 (a/b/g/n), wireless USB, ultrawide band, and the like. The local data link 228 and the wireless transceiver 230 may be deactivated or put into a low-power state during periods of inactivity to conserve battery power.

The communication unit 224 may comprise the processor 220. The processor 220 is powered by the battery power supply 218. Instructions executable by processor 220 may be stored on machine-readable storage medium 238. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types. In certain embodiments, a particular software module or component may comprise disparate instructions stored in different locations of a memory device, which together implement the described functionality of the module. Machine-readable storage medium 238 may be the repository of various modules configured to perform any of the features described herein. According to alternative embodiments, the processor 220 may further include memory and/or firmware.

According to the illustrated embodiment, machine-readable storage medium 238 comprises a time-of-flight module 240, a threshold module 242, a tank parameters module 244, a monitored condition module 246, and a communications module 248. Time-of-flight module 240 may be configured to interpret data received from emitter 206 and perform calculations in order to determine a time-of-flight. As described above, with a known tank geometry, the time-of-flight may be used to determine the volume of a liquid stored in the tank. Threshold module 242 may be configured to compare the determined time-of-flight or the volume of liquid stored in the tank to a specified threshold. Further, threshold module 242 may also store and compare other thresholds related to monitored conditions detected by system 200 (e.g., battery level, temperature, etc.). Tank parameters module 244 may be configured to store information regarding a monitored tank. For example, tank parameters module 244 may store information regarding a tank geometry, a tank volume, etc. Further, tank parameters module 244 may be configured to determine a volume of liquid stored in a tank based upon a determined time-of-flight. Monitored condition module 246 may be configured to detect a change in a monitored condition (e.g., use of a liquid stored in a tank, of the liquid level monitoring system, etc.). System 200 may receive input from one or more sensors (e.g., temperature sensor 208) configured to detect changes in a monitored condition. According to other embodiments, a sensor may be used to determine when liquid is being removed from the tank. Communications module 248 may be configured to selectively transmit an indication of the volume of the liquid in the tank either via a satellite radio, the local data link 228, or the local wireless transceiver 230.

The processor 220 may also be in electrical communication with the satellite radio 214 by way of the data link 236. The data connection 226 and the electrical cable 234 may be embodied within a single cable. The satellite radio 214 is in communication with an antenna 216 and the battery power supply 218. To minimize size and cost, the satellite radio 214 may be a simplex radio capable of transmitting but not receiving. Alternatively, a two way radio capable of sending and receiving commands can be utilized.

According to one embodiment, the processor 220 may measure the liquid level in a tank according to a schedule. When scheduled measurements occur, information about the time-of-flight, the temperature of the liquid, and the battery level may all be collected and transmitted in a single transmission using satellite radio 214 and antenna 216. According to an alternative embodiment, one or more sensor components may provide input to the system 200 when a change in a monitored condition is detected.

Once a measurement has been made, the measurement may be compared against one or more thresholds to determine whether the measurement should be classified as a reportable event and transmitted. For example, if a measurement of a liquid fuel level indicates that the tank is nearly full, the system 200 may be configured to not transmit that measurement. The thresholds may be variable or fixed, depending on a particular application. For example, in certain applications it may be important that the tank is never completely depleted. Accordingly, in this application, system 200 may be configured to transmit more regularly (e.g., weekly) or at a higher fill level threshold (e.g., below 40% of capacity). Further, system 200 may also be used in some applications where use of the liquid is sporadic, such as a cabin. During periods of occupancy, the liquid fuel may be used at a relatively rapid rate in order to provide heat, electricity, fuel for cooking, and the like. In this application, it may be desirable to know relative changes in the level of a liquid fuel, since such changes may warrant closer monitoring during a period of activity, and less frequent monitoring during a period of inactivity. In another example, an appropriate schedule for making measurements may be based upon seasonality or a time of year. For example, in certain agricultural applications, a liquid fuel (e.g., propane) may be used more heavily in the winter than in the summer. Accordingly, in the summer, the system may be configured to report a liquid level once per month. In the winter, the system may be configured to report the liquid level once per week.

FIG. 2 represents only one possible embodiment of an ultrasonic liquid level monitoring system. The configuration of the system 200 may be varied according to alternative embodiments. For example, as illustrated in FIG. 1B, a liquid level monitoring system may include a battery box. In such embodiments, various components shown in the communications unit 224 may be located in the battery box. In other embodiments, communication technologies in addition to, or in place of, satellite radio 214 may be utilized. It is contemplated that an Internet connection via a fixed telephone network, wireless telephone network, cable network, or other known networking technologies may be utilized to transmit time-of-flight data, temperature data, and battery level of the system.

Figure 3:
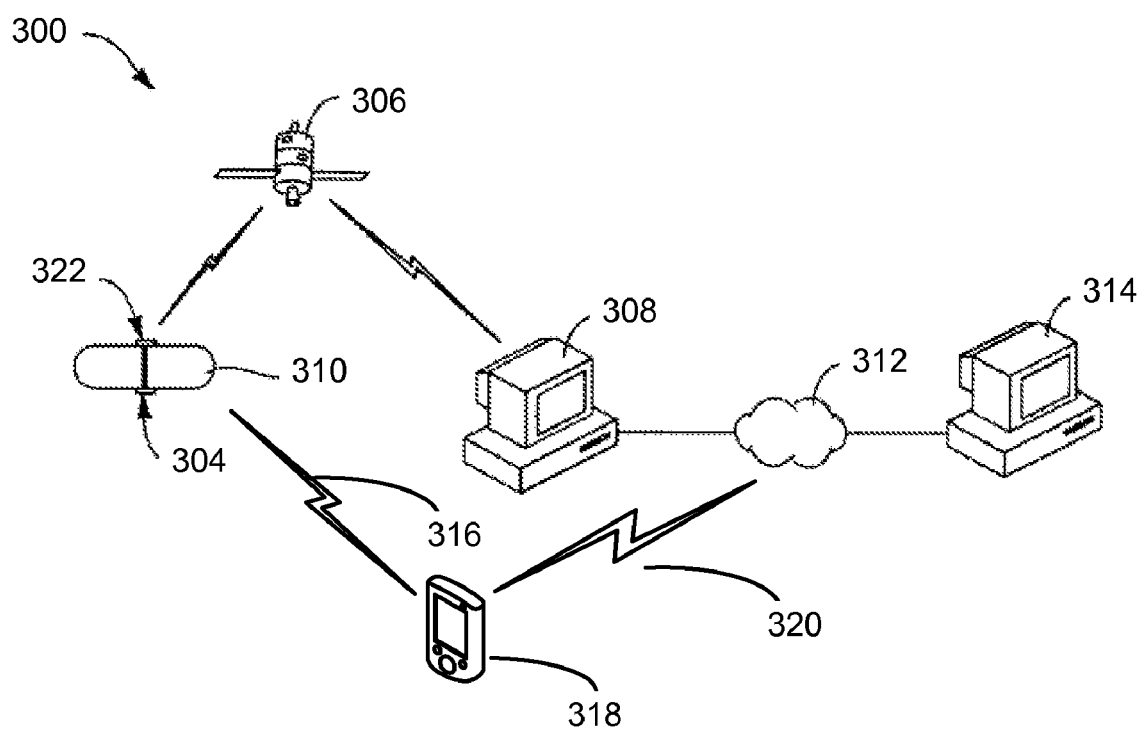
FIG. 3 illustrates a working environment of a propane tank and an ultrasonic liquid level monitoring system.

Referring to FIG. 3, a working environment 300 is shown wherein data is collected by a communications unit 322 from a transducer unit 304 and transmitted via a satellite data communication link. The data may include time-of-flight, temperature data, battery level data, and the like. The data may be transmitted from a first interface via a satellite data link 306 to an Earth station 308. The data may be alternatively or concurrently transmitted from the communications unit 322 to a portable electronic device 318 via a second interface, such as a local wireless interface 316.

Earth station 308 or portable electronic device 318 receives the data input and, together with previously stored information on tank geometry or dimensions and suitable computer readable instructions, processes the received data to calculate the volume of the liquid in the tank 310. The calculated measurement may also be stored in the storage medium and may be read out, and displayed by Earth station 308 or portable electronic device 318. Earth station 308 or portable electronic device 318 may be in electrical communication with a network 312, such as a LAN, WAN, or the Internet. Through network 312, the calculated measurement may be read out, displayed or stored on a second computer 314. Portable electronic device 318 may be connected to network 312 using mobile data communications link 320. In alternative embodiments, portable electronic device 318 may lack a mobile data communications link, but may later be synchronized with a computer system and may, at that time, transfer information about the volume of the liquid in the tank 310.

Portable electronic device 318 may be embodied as a wide variety of commercially available portable electronic devices. For example, portable electronic device 318 may be a portable computer (e.g., a laptop computer, or a tablet computer, such as an iPad), a personal digital assistant (PDA), or a "smart" cellular telephone. Many commercially available portable electronic devices include the ability to communicate using wireless data protocols, such as Bluetooth, IEEE 802.11, or include wired communication ports, such as Ethernet, RS-232, USB, or IEEE 1394. Further, many commercially available portable electronic devices are capable of performing calculations and running software applications that may be required in order to determine a liquid level or to interface with the communications unit 322. A local data link configured to communicate with a portable electronic device is advantageous in minimizing the installation and servicing costs associated with a liquid level monitoring system.

Figure 4A:
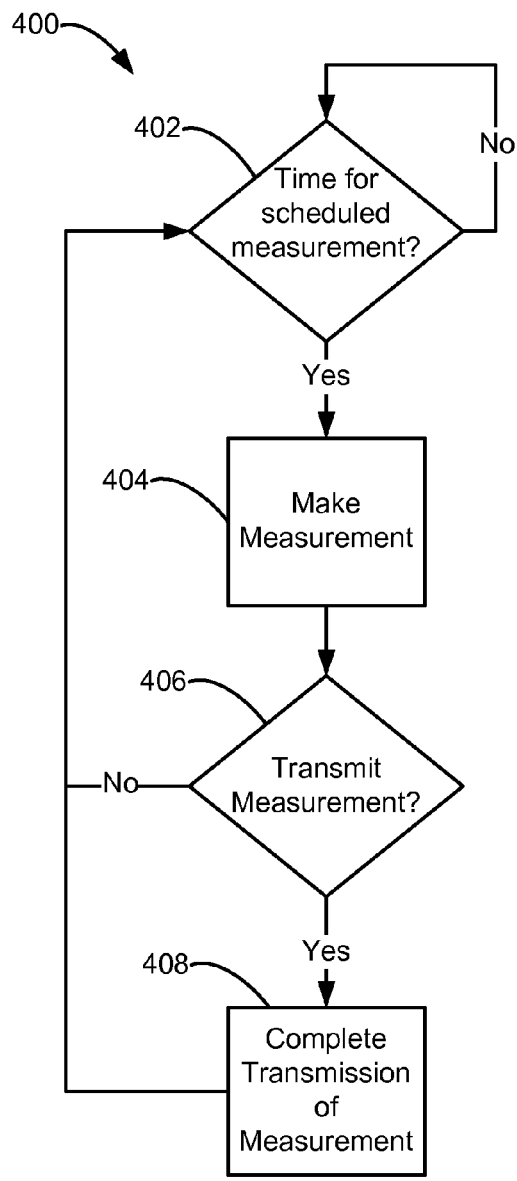
FIG. 4A is a flow chart illustrating one embodiment of a method for making measurements of a liquid level based on a schedule for making measurements.

FIG. 4A illustrates a flow chart of method 400 for determining the occurrence of an event based on a schedule for making measurements. At 402, it may be determined if it is time for a scheduled measurement. According to various embodiments, the measurements may be scheduled based on the needs of a particular application. According to one embodiment, measurements may be made every 12 hours. If is time for a scheduled measurement, a measurement may be made at 404. As discussed above, a measurement may include a determination of a time-of-flight, a temperature, a battery level, or other characteristic. At 406, it may be determined whether the measurement qualifies as a reportable event and is to be transmitted. A variety of thresholds may be utilized for purposes of comparison with the results of the measurement obtained at 404. For example, a threshold may be established to indicate when a sufficient quantity of the consumable liquid has been depleted and a refill is necessary. In another example, a threshold may be established to indicate when any battery is nearly depleted, and a replace battery event is to be transmitted. Further, according to some embodiments, thresholds may be established automatically based on tank dimensions. According to such embodiments, the thresholds may be specific to a particular tank or application.

If a measurement is determined to be a reportable event that is to be transmitted, the measurement may be transmitted at 408. According to multiple embodiments, following the completion of transmission of the measurement, multiple notifications may be generated based on established conditions. For example, where unavailability of a liquid fuel may be costly, multiple notifications regarding a fuel measurement below a specified threshold may be generated. E-mail messages, text messages, automated telephone recordings, and other such notification mechanisms may be employed.

Figure 4B:
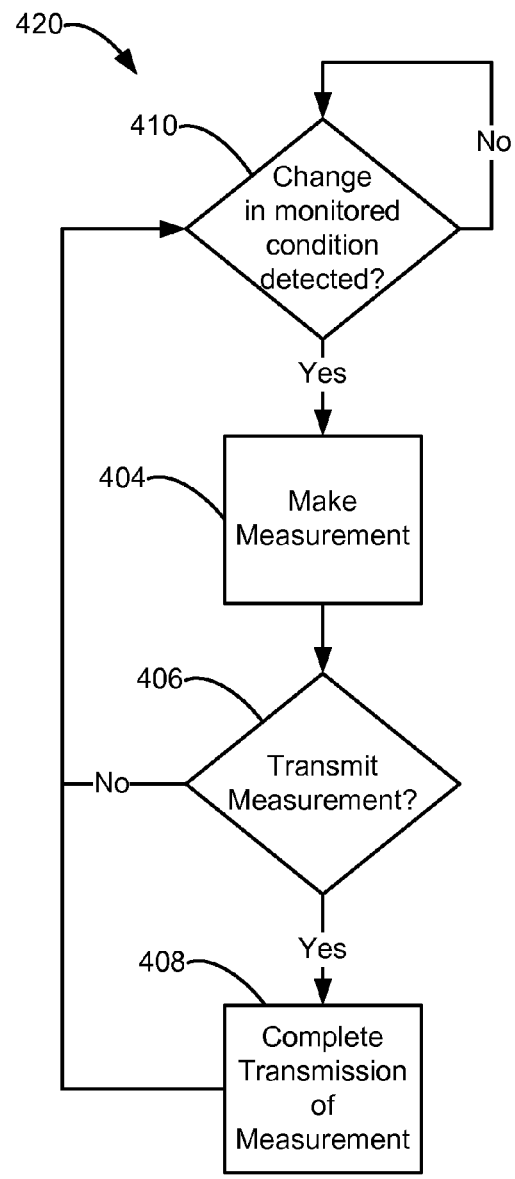
FIG. 4B is a flow chart illustrating one embodiment of a method for making measurements of a liquid level based on a change in a monitored condition, such as a tank fill level.

FIG. 4B illustrates a flow chart of method 420 for making measurements of a liquid level based on a change in a monitored condition. A variety of conditions or events may be monitored and used as triggers for initiating the transmission of a measurement. For example, battery status, temperature, time of year, flow of the liquid from the tank, time since a previous measurement, a tank fill level, etc., may all be monitored conditions that may trigger the reporting of a measurement. Once a change in a monitored condition is detected at 410, method 420 may operate similarly to method 400.

Figure 4C:
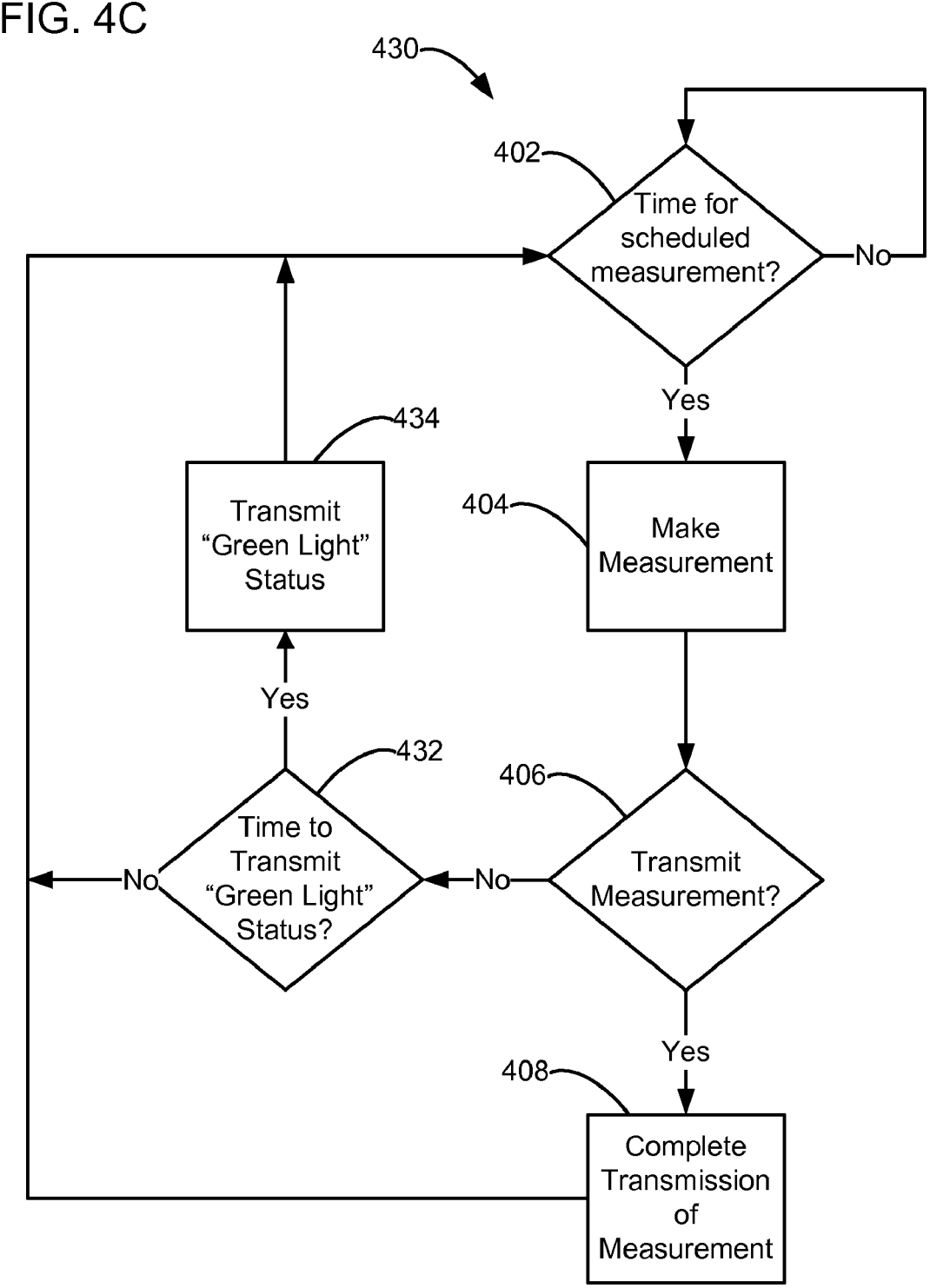
FIG. 4C is a flow chart illustrating one embodiment of a method for transmitting a "green light" status event, according to a schedule where the status of liquid level monitoring system is unchanged.

FIG. 4C illustrates a flow chart of a method 430 for transmitting a "green light" status event according to a schedule where the status of a liquid level monitoring system is unchanged or the liquid level in a monitored tank is above a reportable threshold. According to the illustrated embodiment, method 430 is similar to method 400 at 402, 404, 406, and 408; however, if at 406, it is determined that the measurement is not to be transmitted, method 430 may determine at 432 whether a "green light" status should be transmitted. A "green light" status may be a brief communication indicating that a liquid level monitoring system continues to function. A "green light" status may be transmitted according to an established schedule (e.g., weekly, monthly, quarterly, etc.) in order to provide a scheduled indication that a system continues to function. According to some embodiments, a measurement may also be transmitted with the "green light" status regarding the liquid level in the tank. If it is time, according to an established schedule, a "green light" status may be transmitted at 434. If a system fails to transmit a scheduled "green light" status according to an established schedule, this may be an indication that the system is no longer functioning, and should be checked by service personnel.

Figure 5A:
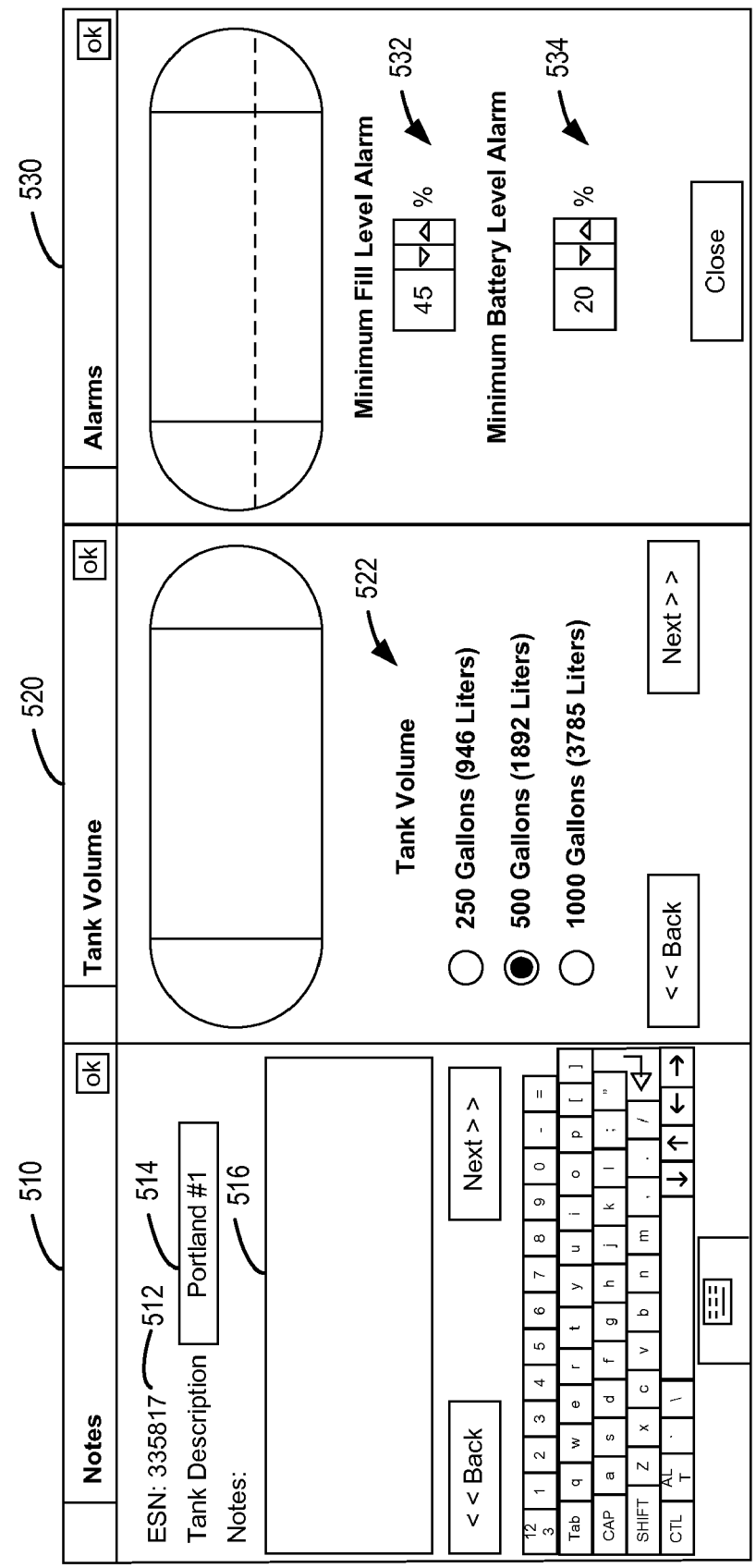
FIG. 5A illustrates a plurality of screen shots of a mobile computing platform that may be utilized in connection with the commissioning and configuration of a liquid storage tank.
Figure 5B:
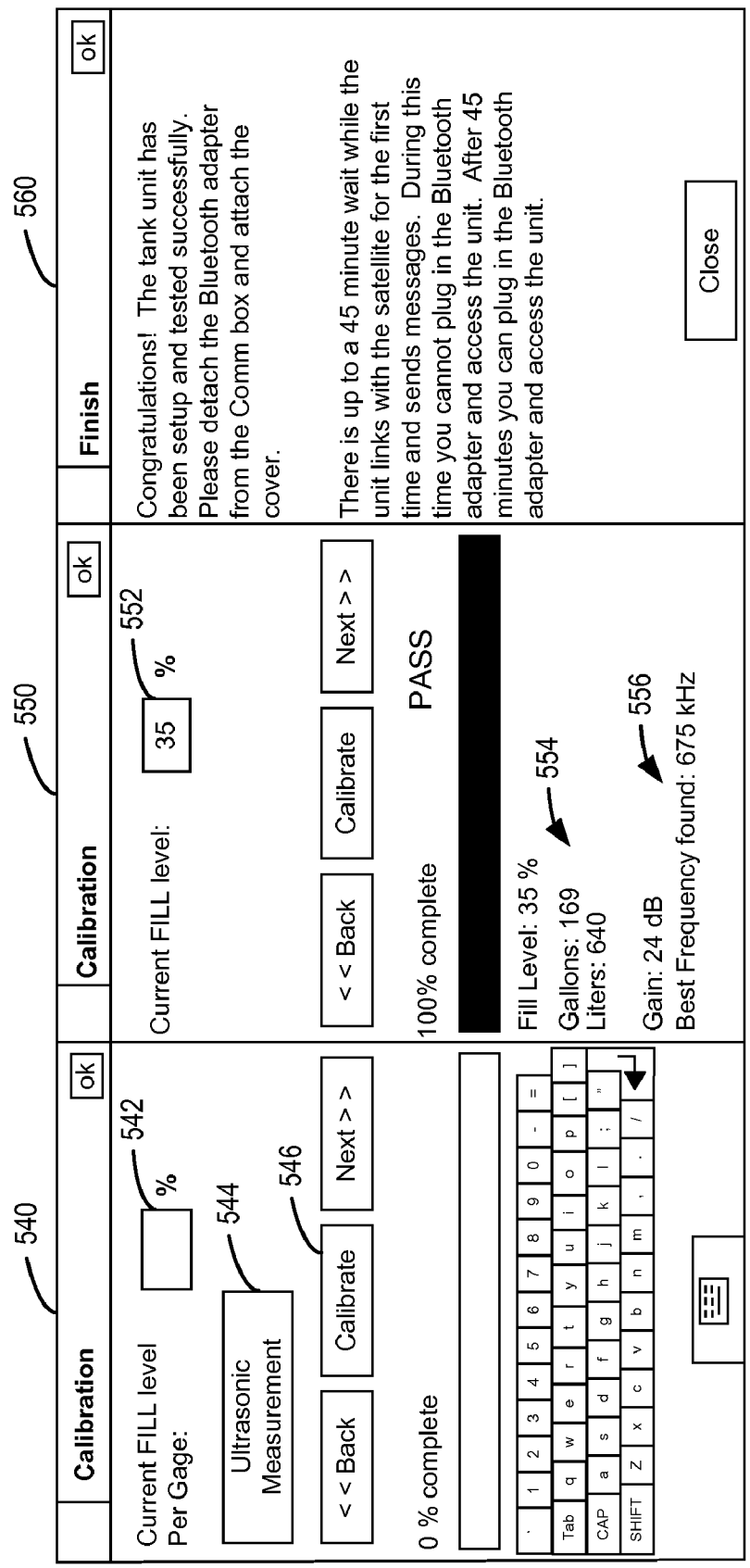
FIG. 5B illustrates a plurality of screen shots of a mobile computing platform that may be utilized in connection with the commissioning and configuration of a liquid storage tank.

FIGS. 5A and 5B illustrates a plurality of screen shots of a mobile computing platform that may be utilized in connection with the commissioning and configuration of a liquid storage tank. Screen shot 510 illustrates a notes screen in which information regarding a tank may be entered. Screen shot 510 may include an electronic serial number 512 ("ESN"). The ESN may be a unique identifier associated with each monitored tank. A tank description and/or location 514 and one or more notes 516 may also be entered by an operator. Screen shot 520 illustrates a screen in which an operator may specify particular data about a tank, as part of a commissioning process. For a standard tank geometry, an operator may select a capacity using options displayed at 522. Alternately, methods to input specific tank geometry may be provided. For example, tank volumes or geometries may be manually specified by an operator.

Screen shot 530 illustrates a screen that may be utilized to establish one or more alarms that may be associated with a monitored criteria. According to the illustrated embodiment, the monitored criteria include a minimum fill level 532 and a minimum battery level 534. Depending upon the application for which the particular storage tank is used, thresholds 532 and 534 may be adjusted. For example, certain applications may require high reliability, and thus a minimum fill level alarm 532 may be set at an appropriately high level in order to ensure that the tank is not depleted. According to alternative embodiments, additional monitored criteria may be included and thresholds associated with such criteria may be specified.

Screen shot 540 illustrates a first calibration screen. Using current fill level 542 a user may input a fill level based on an on-site gauge connected to the tank. The manual input may be based on the on-site gauge mounted to the tank. Alternatively, a user may make a measurement using the ultrasonic fuel level measurement system by pressing button 544. Using calibration button 546 on screen 540, a user may open a calibration screen 550. Calibration screen shot 550 may show a current fill level 552. The calibration process may be used to optimize a transducer for use with a specific tank. One portion of the calibration process may include identification of a gain and an optimized frequency to be used at 556. The optimized frequency value may be stored for future usage by the system. The calibration process may also provide a user with an indication of a current fill level, both in relative terms (e.g., 35% of capacity) or as a measurement of the number of gallons/liters stored in the tank 554. Additional details regarding the selection of an optimized frequency are provided in the 425 Patent. Screen shot 560 illustrates a message that may be displayed upon the successful commissioning of the unit.

It will be obvious to those having skill in the art that many changes may be made to the details of the above-described embodiments without departing from the underlying principles of the disclosure. The scope of the present disclosure should, therefore, be determined only by the following claims.

What is claimed is:

1. A method of measuring a liquid level in a tank, comprising:
   providing an externally mounted ultrasonic transducer to generate an ultrasonic beam to pass through a tank wall;
   providing a battery in electrical communication with the ultrasonic transducer to provide power;
   generating an ultrasonic beam using the ultrasonic transducer;
   receiving an echo of the ultrasonic beam off a surface of a liquid;
   determining a time-of-flight calculated as a time elapsed from generating the ultrasonic beam and receiving the echo;
   generating an indication of a volume of the liquid in the tank based on the time-of-flight;
   comparing the indication of the volume of the liquid to a threshold; and selectively transmitting, to conserve battery power, the indication of the volume of the liquid in the tank based on the comparison of the indication of the volume of the liquid to the threshold.

2. The method of claim 1, wherein the threshold comprises a plurality of specific predetermined thresholds particularized for the tank.

3. The method of claim 1, wherein transmitting the indication of the volume of the liquid comprises transmission to a satellite data link.

4. The method of claim 1, further comprising:
mounting the ultrasonic transducer to one of the bottom of the tank and the top of the tank.

5. The method of claim 1, wherein generating the ultrasonic beam is based on a schedule.

6. The method of claim 1, further comprising:
transmitting an indication of continuing operation according to a schedule.

7. The method of claim 1, further comprising transmitting the indication of the volume of the liquid in the tank to a portable electronic device.

8. The method of claim 1, further comprising receiving a configuration instruction from a portable electronic device.

9. The method of claim 1, further comprising:
calibrating the externally mounted ultrasonic transducer to an optimized frequency.

10. The method of claim 1, further comprising:
providing one of a tank geometry; and
wherein generating an indication of a volume of the liquid in the tank is further based on the tank geometry.

11. The method of claim 1, wherein the threshold comprises a liquid level of the tank.

12. The method of claim 11, wherein the threshold comprises 20% of a maximum fill capacity of the tank.

13. The method of claim 1, further comprising:
monitoring a condition;
detecting a change in the monitored condition; and
generating the ultrasonic beam using the ultrasonic transducer, based on the detection of the change in the monitored condition.

14. The method of claim 13, wherein the monitored condition comprises one of a battery level, a temperature, and a use of the liquid.

15. A system to measure a liquid level in a tank, the system comprising:
an ultrasonic transducer unit externally mountable to the tank, the ultrasonic transducer comprising:
an emitter to generate an ultrasonic beam to pass through a tank wall and to receive an echo of the ultrasonic beam off a liquid surface; and
a transducer driver in electrical communication with the emitter;
a battery in electrical communication with the ultrasonic transducer unit to provide power;
a processor in electrical communication with the ultrasonic transducer unit;
a non-transitory machine-readable storage medium in electrical communication with the processor, the non-transitory machine-readable storage medium comprising:
a time-of-flight module executable on the processor and configured to measure a time-of-flight between generation of an ultrasonic beam and receipt of an echo of the ultrasonic beam off a liquid surface; and
a tank parameters module executable on the processor and configured to generate an indication of a volume of the liquid in the tank based on the time-of-flight;
a threshold module executable on the processor and configured to compare the indication of the volume of the liquid to a threshold and whether to transmit the indication of the volume of the liquid in the tank based on the comparison of the indication of the volume of the liquid to the threshold, to conserve battery power; and
a communications module executable on the processor and configured to communicate the volume of the liquid in the tank; and
a satellite interface operable to transmit the indication of the volume of the liquid in the tank by a satellite data link.

16. The system of claim 15, wherein the machine-readable storage medium further comprises:
a monitored condition module executable on the processor and configured to detect a change in a monitored condition.

17. The system of claim 16, wherein the monitored condition comprises one of:
use of a liquid stored in the tank, a battery level, and a temperature.

18. The system of claim 15, wherein the communications module is further configured to transmit via the satellite interface an indication of continuing operation.

19. The system of claim 18, wherein the indication of continuing operation is transmitted according to a schedule.

20. The system of claim 15, further comprising:
a local interface operable to transmit the indication of the volume of the liquid in the tank to a portable electronic device.

21. The system of claim 20, wherein the local interface comprises a wireless interface.

22. The system of claim 20, wherein the local interface is operable to receive a configuration instruction from the portable electronic device.

23. The system of claim 22, wherein the configuration instruction comprises the threshold.

24. A system to measure a liquid level in a tank, the system comprising:
means for generating an ultrasonic beam to pass through a tank wall;
means for receiving an echo of the ultrasonic beam off a surface of a liquid;
battery means in electrical communication with the generating means to provide power;
means for determining a time-of-flight calculated as a time elapsed from generating the ultrasonic beam and receiving the echo;
means for generating an indication of a volume of the liquid in the tank based on the time-of-flight;
means for comparing the indication of the volume of the liquid to a threshold; and
means for selectively transmitting, to conserve battery power, the indication of the volume of the liquid in the tank based on the comparison of the indication of the volume of the liquid to the threshold.

* * * * *